United States Patent

Augustine

[15] 3,693,084

[45] Sept. 19, 1972

[54] METHOD AND APPARATUS FOR DETECTING MICROWAVE FIELDS

[72] Inventor: Carl F. Augustine, Farmington, Mich.

[73] Assignee: The Bendix Corporation

[22] Filed: June 17, 1969

[21] Appl. No.: 833,958

[52] U.S. Cl. .................324/106, 324/95, 324/72, 350/160 R
[51] Int. Cl. ..........................G01r 5/26, G01r 21/04
[58] Field of Search...324/106, 95, 72, 58.5 A, 58 A, 324/72.5; 350/160

[56] References Cited

UNITED STATES PATENTS

| | | |
|---|---|---|
| 3,401,262 | 9/1968 | Fergason et al.........350/160 X |
| 3,524,726 | 8/1970 | de Koster...............350/160 X |
| 2,648,047 | 8/1953 | Hollingsworth.............324/95 |
| 2,875,405 | 2/1959 | Frederico....................324/95 |
| 2,995,708 | 8/1961 | Hudson et al............324/95 X |
| 3,487,685 | 1/1970 | Shifrin.....................324/95 X |

OTHER PUBLICATIONS

" Study of Laser Beam Aided by Liquid–Crystal Sensors" ; Laser Focus; January 15, 1965; page 12.

*Primary Examiner*—Rudolph V. Rolinec
*Assistant Examiner*—Ernest F. Karlsen
*Attorney*—William L. Anthony, Jr. and Plante, Hartz, Smith & Thompson

[57] ABSTRACT

A detector for providing a substantially real time display of the intensity distribution of a microwave field having a layer of liquid crystals adjacent a thin continuous resistive film. The microwave field detector of this invention is disclosed in an apparatus for non-destructive internal examination of an object, a microwave power density meter, an impedance matching instrument and an apparatus for forming holograms using microwaves.

14 Claims, 13 Drawing Figures

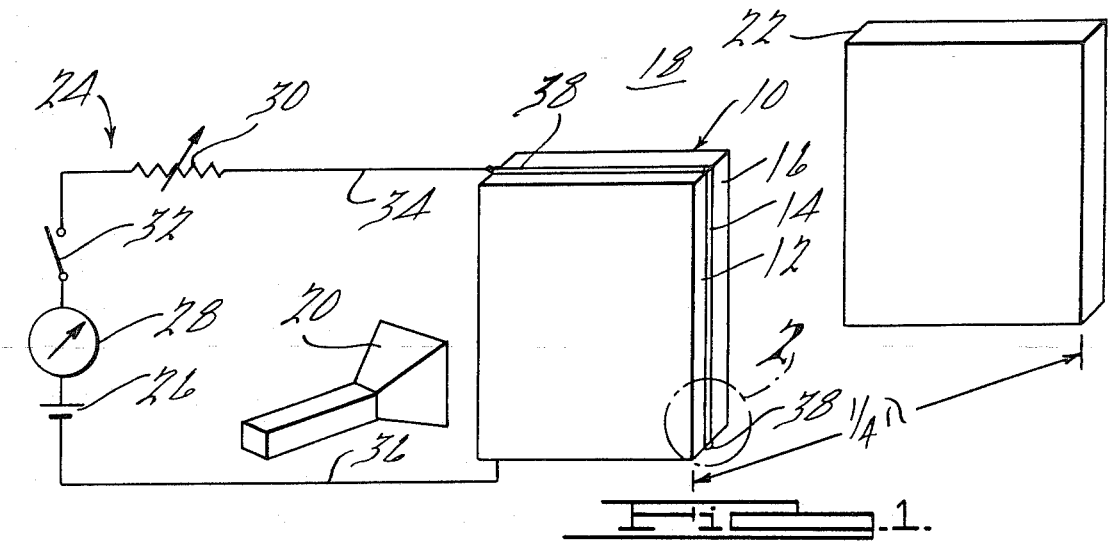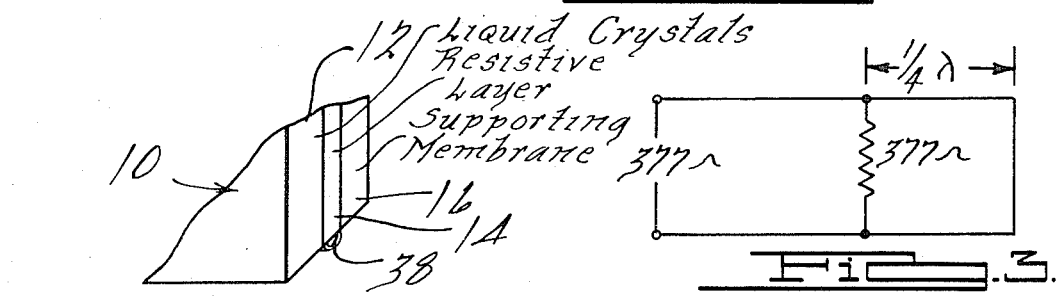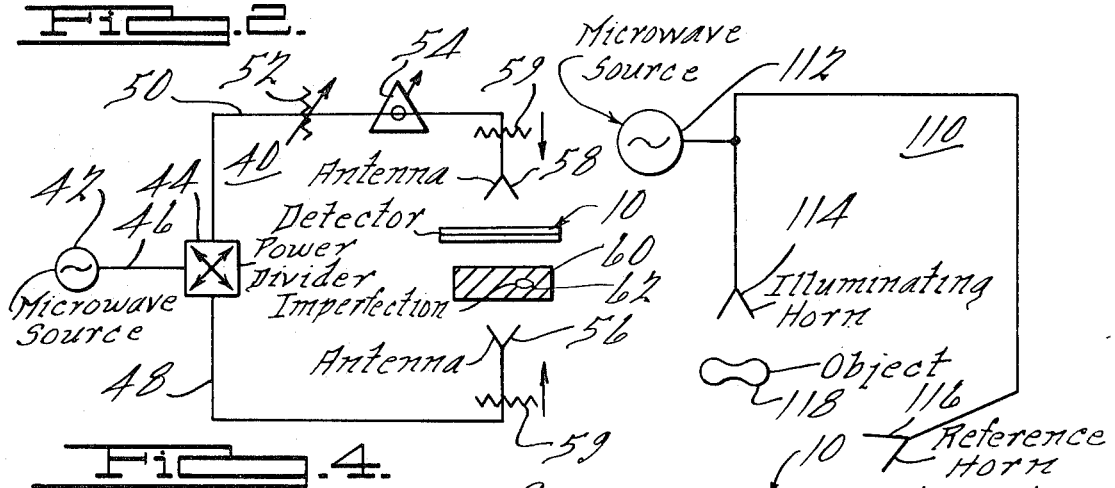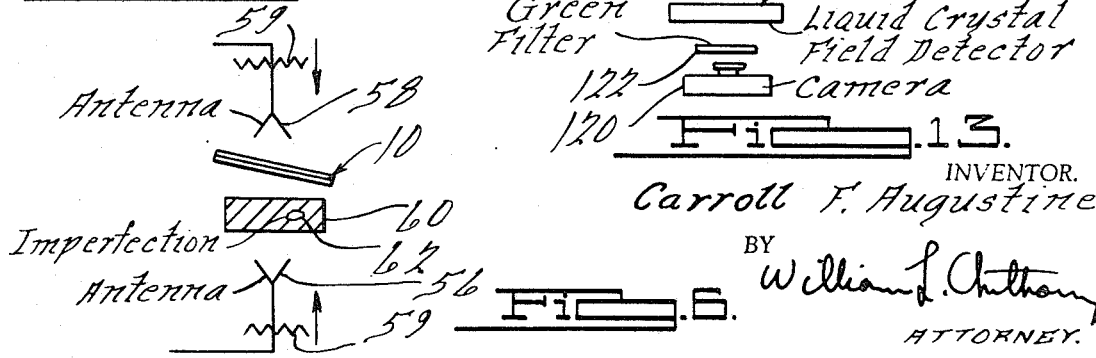

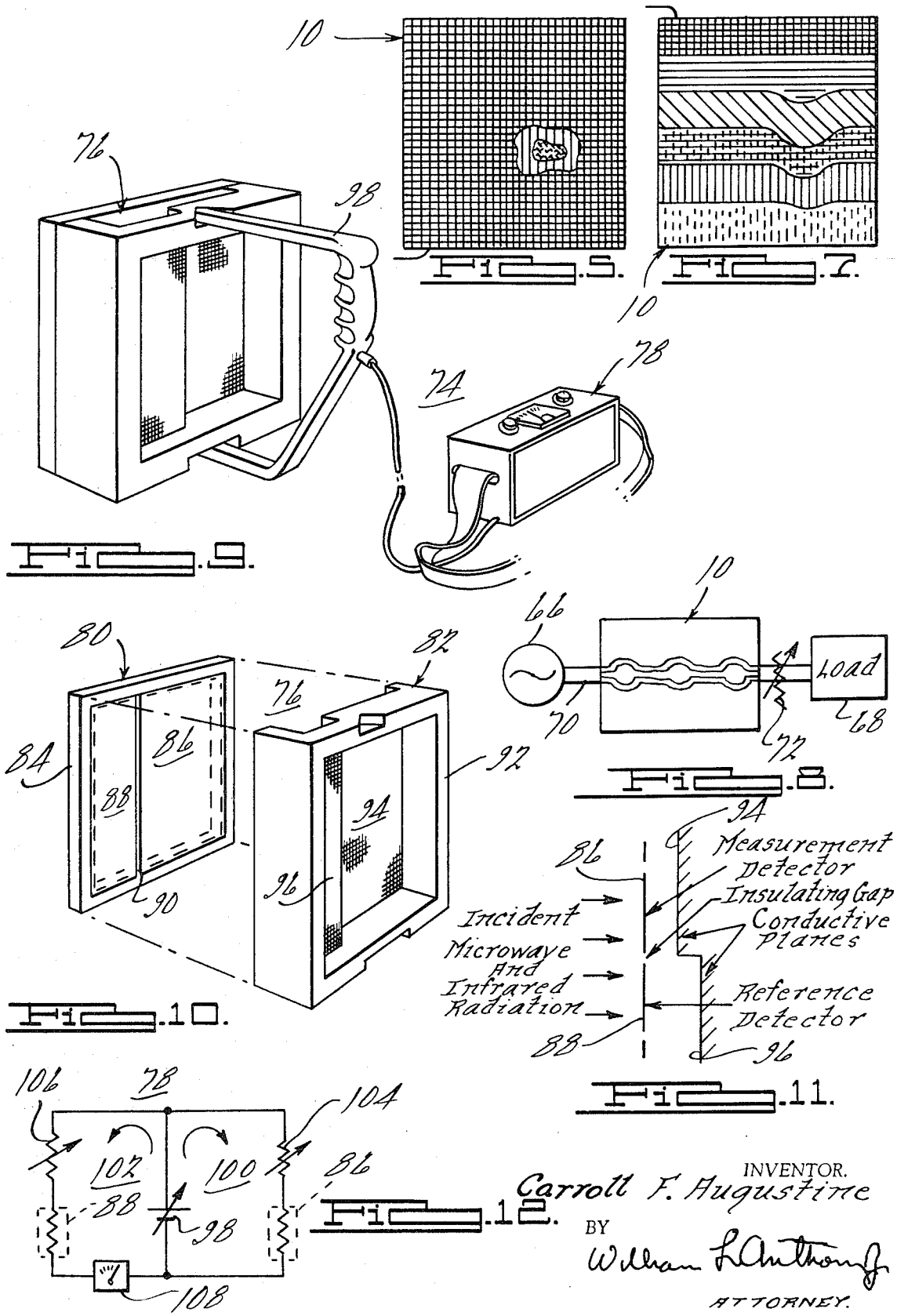

METHOD AND APPARATUS FOR DETECTING MICROWAVE FIELDS

BACKGROUND OF THE INVENTION

1. Field of the Invention

Microwave field detectors.

2. Description of the Prior Art

Microwave fields have been conventionally mapped by scanning point-to-point with a small probe. This method is not only laborious and time consuming, but it is also often inaccurate because the probe disturbs the field thereby causing field distortion. Moreover, information is lost since the scans are not continuous. As a still further disadvantage of these methods, the probes used are generally polarized thereby requiring rotation of the probe to obtain maximum response.

It is also known to continuously map a microwave field on Polaroid color film by exposing the film to white light, initiating the development process, and then exposing the film to a microwave field. The microwave energy heats the silver-halide grains of the film thereby changing the rate at which the development agent diffuses into the grain sites. This process produces color in the developed film which correspond to the levels of intensity of the microwave field. This method is disadvantageous since the process must be critically timed, and moreover, the photographs represent discrete moments in time rather than a continually changing real time map of the microwave field.

The use of liquid crystals for heat imaging is known. These methods generally convert infrared or electrical energy into a heat pattern and thereafter apply the heat pattern to the liquid crystals to provide a color image corresponding to the heat pattern. For an example of infrared imaging, see the patent to Fergusen et al. U.S. Pat. No. 3,114,836. That method utilizes either conductive or non-conductive films for the conversion of infrared energy into a heat pattern.

In the known method of converting electrical energy into a color image, an array of discrete resistive elements are utilized, each of which may be independently heated by passing a current therethrough, to form a heat pattern. It will be appreciated that the latter device is complex and is not suitable for use as a microwave detector since the resistive section is discontinuous and has associated therewith many input conductors, both of which conditions would cause field distortions. Moreover, the structure is quite thick, which is a disadvantage as will be apparent in the discussion of the microwave field detector of this invention which appears below.

SUMMARY OF THE INVENTION

The present invention provides a substantially real time microwave field detector having a film of liquid crystals or the like in close proximity with a thin, continuous resistive layer. A microwave field incident on the composite structure generates alternating currents in the resistive layer which are in accord with the intensity of the microwave energy. The alternating electrical currents generate a heat pattern through dissipation in the resistive layer which corresponds to the intensity distribution of the incident microwave field. The heat pattern is imposed on the adjacent liquid crystals through thermal transfer. Since the liquid crystals assume particular colors in accordance with the temperature of the crystals, they will respond chromatically to incident microwave energy levels. More particularly, a visible color pattern is produced representative of a map of the intensity distribution of the microwave field.

This invention also provides a microwave field detecting system which is particularly suited for use as a device for plotting the radiation pattern of an antenna. In this embodiment, a conducting plane is disposed one-quarter of the wavelength of the radiated energy from a microwave field detector of this invention. Additionally, the resistive layer of the detector is constructed such that it has a resistivity of 377 ohms per square such that the impedance of the composite structure equals that of free space. As a result of the conducting plane and the 377 ohms per square resistivity, all of the microwave energy having a direction of propagation perpendicular to the resistive layer is absorbed therein. It will be appreciated that without these features a substantial part of the energy would be transmitted through or reflected from the detector without absorption. As a result of the near complete absorption, the temperature of the detector is a direct quantitative measure of the power level of the incident microwave field and may be readily determined by calibration of the detector. As a further advantage, field disturbances due to the presence of the system are quite small, particularly in the case of far field patterns.

To facilitate the calibration of the detector, the thickness of the resistive layer must be very small in comparison with the skin depth of currents induced by incident microwave energy. As a result, the effective resistivity of a layer is the same for both microwave-induced currents and DC currents. Also, if the detector is constructed of thin layers such that the temperature gradient from the front surface to the rear surface is small, microwave power and DC calibration current power of equal amounts will provide the same film temperature. As a result of these combined conditions, the relationship between DC currents and DC power can be used to determine incident microwave power thereby providing a simple yet effective means for calibrating the detector.

To obtain a resistive layer having a resistivity of 377 ohms per square and a layer thickness small compared with the skin depth of the microwave-induced currents, it has been found that a material having a resistivity between 10 and 120 times that of copper is preferably used as the resistive layer. Still more preferably, a material having a resistivity between 50 and 80 times that of copper, such as nichrome, should be used.

This invention further provides an apparatus for nondestructive internal examination of an object which is permeable to microwave radiation having a first source of radiation directed at the object for modulation thereby, a second source of radiation which interferes with the modulated radiation from the first source, and a microwave field detector positioned to display the resulting interference pattern. The display on the microwave detector reveals imperfections in the object under examination.

This invention still further provides a method and apparatus for determining standing wave ratios and matching the impedance of a load to the impedance of a source for optimum power transfer. Particularly, a transmission line is used between the source and the load which radiates a portion of the transmitted energy. A microwave detector of this invention is positioned to receive the radiated portion. If the impedances of the source and load are not equal, standing waves result which are displayed by the detector. The impedances can be matched by minimizing the standing waves.

As a yet additional embodiment, this invention provides a power density meter which is particularly suited for detecting and measuring leakage of microwave energy around the doors and the like of microwave ovens. In this regard, it has been discovered that commercial microwave ovens may leak potentially dangerous levels of microwave energy. The power density meter includes a first microwave detector according to this invention which records both microwave and infrared radiation and a similar second detector recording only infrared radiation. Through measuring only the difference in color levels of the detectors, the infrared energy contribution is effectively "canceled" since it is the same for both. More particularly, a first reflector is positioned one-quarter of a wavelength from the first detector to cause all of the incident microwave energy to be dissipated in the resistive film. A second reflector is positioned one-half wavelength from the second detector such that all of the incident microwave energy is reflected and none is absorbed by the resistive film. A circuit is provided for balancing the color levels of both detectors to provide a quantitative measurement of the incident microwave energy.

As a still additional embodiment, this invention provides an apparatus for forming holograms using microwave sources. More particularly, a first source of coherent microwave energy is directed at an object for modulation thereby and a second source of coherent microwave energy is directed so as to interfere with the first source. A microwave detector according to this invention is positioned in the region of interference of the two sources for displaying the interference pattern. In essence, the interference pattern represents a hologram of the object. A camera or other imaging apparatus is positioned to record the interference pattern displayed on the detector and to provide a transparency of the pattern. The image of the object may be reconstructed by illuminating the transparency with coherent light.

Those skilled in the art will appreciate that the chemical composition of the liquid crystals may be varied as taught by the various publications to select desired temperature ranges of operation. In this manner, the range of microwave power to which the detector responds may also be adjusted.

BRIEF DESCRIPTION OF THE DRAWINGS

FIG. 1 is an illustration of a system for detecting an antenna radiation pattern using a microwave field detector according to this invention.

FIG. 2 is a partial detailed view of the microwave field detector which is incorporated in the system shown in FIG. 1.

FIG. 3 is a schematic diagram of a transmisson line circuit which is analogous to the microwave field detecting system of FIG. 1.

FIG. 4 is a schematic illustration of an apparatus for nondestructive internal examination of an object using a microwave field detector according to this invention.

FIG. 5 is an illustration of a typical output display of the examining apparatus of FIG. 4.

FIG. 6 is an alternate embodiment of the examining apparatus of FIG. 4.

FIG. 7 is an illustration of a typical output display of the examining apparatus of FIG. 6.

FIG. 8 is an illustration of a source/load impedance matching device using a microwave field detector according to this invention.

FIG. 9 is a perspective illustration of a microwave power density meter using a microwave field detector according to this invention.

FIG. 10 is a partial, assembly view of a portion of the microwave power density meter of FIG. 9.

FIG. 11 is a top view of the essential components of the microwave power density meter of FIG. 9.

FIG. 12 is a diagram of a circuit for the microwave density meter of FIG. 9 which is used to provide a quantitative determination of the energy level of incident microwave energy.

FIG. 13 is an illustration of an apparatus for producing holograms using microwave radiation.

DETAILED DESCRIPTION OF THE PREFERRED EMBODIMENTS

Description and Operation of The Microwave Field Detector 10

A microwave field detector 10, shown in detail in FIG. 2, is in common to the various embodiments of the present invention. The detector 10 includes a film 12 of cholesteric liquid crystals for providing a continuous chromatic display of the temperature distribution of the film, a continuous layer 14 of resistive material contiguous the film 12, and a membrane 16 for structurally supporting the composite structure of the liquid crystalline film 12 and the resistive layer 14. For example, one square foot of Mylar$^R$ polyester of $12\mu m$ thickness having a vacuum-deposited nichrome coating of a few angstroms thickness and a layer of liquid crystals of approximately $12\mu m$ thickness on the nichrome coating has been used with excellent results.

The liquid crystals of the film 12 are more precisely termed cholesteric liquid crystalline phase material. These materials are discussed in detail in the article by G. H. Brown and W. D. Shaw titled "The Mesomorphic State—Liquid Crystals" in Chemical Reviews, Vol. 57, No. 6, December 1957, p. 1,049; the patent to Fergusen et al. U.S. Pat. No. 3,114,836; and the patent to Fergusen U.S. Pat. No. 3,409,404. In view of the extensive documentation of the properties of liquid crystals and their current commercial availability, a listing of their compositions will not be presented here. It is important to note, however, that the liquid crystals chromatically respond to temperature thereby providing a measurement of the temperature of the crystal by their color, i.e., the color or wavelength of the light reflected from their crystals. The temperature range to which the crystals respond may be adjusted by altering the composition of liquid crystals as described in the above references.

In essence, the microwave field received by the composite structure induces electrical currents in the resistive layer 14 which alternate at the frequency of the incident microwave energy. The level of the currents is in accord with the intensity of the incident microwave energy. Since the layer 14 is constructed of a resistive material, the alternating electrical currents dissipate in the resistive layer 14, thereby generating thermal energy in the layer 14. Since the film 12 of liquid crystals is in contact with the resistive layer 14, there is efficient and substantially immediate transfer of thermal energy from the resistive layer 14 to the liquid crystalline film 12. As a result, the temperature of the liquid crystalline film 12 is elevated in accordance with the gain of thermal energy from the resistive layer 14, and the loss of thermal energy from the liquid crystalline film 12, for an example of the latter, through conduction to the ambient environment.

Since the generation of thermal energy in the resistive layer 14 by incident microwave energy is a local effect, local temperature variations are produced on the liquid crystalline film 12 which result in a color pattern which maps the power or intensity distribution of the microwave field.

By virtue of the nature of the liquid crystals, the process is continuous and reversible such that the liquid crystalline film 12 provides a substantially real time map of the changes in the intensity distribution of the incident microwave field.

To prevent lateral smearing of the color pattern on the detector 10, it is preferred to use materials in the construction of the detector 10 which have low coefficients of lateral conductivity to minimize lateral heat transfer which causes "smearing" of the color pattern and consequent loss of resolution. It is also preferred to construct the detector 10 of materials having low heat capacity so as to provide for rapid changes in the temperature of the structure and consequent short response times to changes in the intensity of the incident microwave field.

The microwave detector 10 as described above has exhibited a sensitivity of approximately 3 mw per square, i.e., the change in power necessary to cause a discernible change in color.

The microwave field detector 10 may be used without additional structure if desired to suit particular applications. If maximum absorption of microwave energy is desired under these conditions, the detector 10 should be constructed such that it has an impedance of approximately 188.5 ohms per square. Since the liquid film 20 and the supporting membrane 10 contributes little to the impedance of the composite structure, the resistivity of the resistive layer 14 normally determines impedance of the overall structure. The resistivity of the resistive layer 14 may be constructed by controlling its thickness of material to provide the desired resistivity, e.g., 188.5 ohms per square.

The terminology 188.5 ohms "per square" may be used here to describe surfaces of 188.5 ohms per square inch as well as 188.5 ohms per square foot, per square meter, etc. This will be better understood by first considering, for example, a resistive surface of one inch square having conductive bars connected to two opposite ends of the surface. If the resistivity between the conducting bars is 188.5 ohms, then the resistive surface is considered to have a resistivity of 188.5 ohms per square inch. If, for example, an identical resistive surface was constructed which was one foot square and conducting bars were connected to two opposite ends of that surface, it will be discovered that the resistance between the conducting bars is also 188.5 ohms. This will be appreciated since, as the square is made larger, the flow path length increases which increases resistivity and the flow path width also increases which decreases resistivity. These two effects are off-setting thereby providing a constant resistivity between the bars as the size of the square increases.

If it is desired to reduce the field distorting effect of a microwave detector 10 which is used without additional structure, the impedance of the composite structure may be increased. However, increasing the impedance of the structure also reduces the microwave absorption property of the structure thereby correspondingly reducing the sensitivity of the microwave detector 10.

Description and Operation of Microwave Field Detecting System 18 of FIG. 1

In view of the preceding discussion of the operation of the microwave detector 10 used without additional structure, the advantages of the detecting system 18 of FIG. 1 will become apparent. Particularly, the system 18 of FIG. 1 provides: (1) complete absorption of the incident microwave energy for high sensitivity, and (2) relatively low field distortion. The microwave field detector 10 used without additional structure can obtain only one of these advantages, and the one must be obtained at the expense of the other.

The system 18 as shown in FIG. 1 is arranged for plotting the radiation pattern of a microwave antenna 20. Particularly, the system 18 includes a microwave field detector 10 according to this invention positioned to receive a microwave field radiated by the antenna 20, a conducting plane 22 positioned parallel to and spaced from the microwave field detector 10 at a distance equal to one-quarter of the wavelength of the microwave energy radiated by the antenna 20, and a calibrating circuit 24.

The microwave field detector 10 of the plotting system 18 is constructed such that it has the impedance of free space, i.e., 377 ohms. A schematic diagram of an analogous transmission line structure is shown in FIG. 3. The operation of this structure is described in detail in Ramo & Whinnery, "Fields and Waves in Modern Radio," Second Edition, 1953, pp. 312–314. In view of that reference, it will be appreciated that the 377 ohms per square resistivity and the position of the conducting plane create an overall structure that absorbs substantially all of the incident microwave energy. This energy is dissipated in the microwave detector 10. Complete absorption not only increases the sensitivity of the plotting system 18, but also minimizes field distortion. In effect, the detecting system 18 appears "invisible" to the radiating antenna.

In order to quantitatively determine the amount of microwave energy that is incident on the microwave detector 10, it is desirable to provide means for calibrating the detector 10. In this regard, it should be understood that the detector 10 responds to changes in various environmental conditions such as ambient temperature and incident infrared energy as well as incident microwave energy. Accordingly, there must be a separate calibration for each combination of environmental conditions. Moreover, the temperature response characteristics of the liquid crystals tend to change with age thereby requiring periodic recalibration. In view of these factors, frequent calibration is necessary, and therefore, a convenient calibration scheme is highly desirable.

Probably the most obvious method for calibrating the device would be to utilize a source of microwave energy which is capable of radiating known power levels. The detector 10 could be exposed to predetermined energy levels radiated by the source to determine the relationship between the colors assumed by the detector 10 and the incident radiation levels. In this manner, calibration charts may be synthesized. However, since a suitable microwave source for calibrating the detector 10 according to the foregoing method would be relatively costly and generally inconvenient to use, that calibration method is not preferred.

The present invention provides a calibration circuit 18 which is simple, low in cost, and accurate. The calibrating circuit 18 includes a series connection of a source of DC current 26, a DC ammeter 28, a variable potentiometer 30, and an activating switch 32. The calibrating circuit 18 is connected across opposite ends of the resistive layer 22 by conductors 34 and 36. The calibrating circuit 18 may further include conducting bars 38 extending across the opposite ends of the resistive layer 22 to provide a uniform potential distribution across the resistive layer 22, and consequent uniform current flow through the resistive layer 22. The conducting bars 38 are preferably removed after calibration to avoid any disturbance of an incident microwave field by their presence.

It will be appreciated that an AC current source may be used in place of a DC current source 26. However, the use of an AC current source should be compensated for in power calculations (explained below) using the RMS values of current flow through the calibration circuit. The RMS current values may be conveniently obtained by using a conventional AC ammeter.

In the operation of the calibration circuit 18, the activating switch 32 is closed to establish a heating current flow through the resistive layer 14. The resistance of variable potentiometer 30 is gradually decreased so as to increase the heating current until the temperature of the resistive layer is sufficient to cause the first color change in the liquid crystal film 12, e.g., from black to red. The current level at the first color change, as indicated by the ammeter 28, should be recorded. Subsequently, the flow of heating current through the resistive layer 12 is gradually increased until the full cycle of color changes have been encountered, e.g., orange, yellow, green, and blue. At each change in color the current through the resistive layer 12 is recorded.

The power density of the microwave field required to maintain given colors is determined by the formula:

$$P = I^2 R / A$$

where:
- $P$ = microwave power per unit area received by the detector 10;
- $A$ = total area of detector 10;
- $I$ = calibration current required to produce the color of interest; and
- $R$ = resistance across resistive layer 14.

Importantly, the resistivity $R$ in the above formula will be the same for both DC and microwave currents provided that the thickness of the resistive layer is small compared with the skin depth. If the skin depth were greater than the thickness of the resistive layer, the effective resistivity in the case of microwave-induced currents would be greater than the DC resistivity of the layer 14, and therefore, the above relationship would not be true for microwave power. In regard to the "skin effect," see Ramo & Whinnery, "Fields and Waves in Modern Radio," Second Edition, 1953, Chapter 6, published by John Wiley & Sons. In view of that reference, it will be appreciated that in a sufficiently thick structure, the microwave-induced currents will be confined to the "skin" of the structure thereby providing a relatively small current flow path and consequent high effective resistivity.

As stated previously, it is preferred to form the layer 14 of a resistive material rather than highly conductive material. In view of the foregoing discussion of the calibration of the detecting system 18 of FIG. 1, the reasons for this preference can now be appreciated.

In the preferred method for forming a resistive layer 22 of sufficient thinness, the resistive material is vacuum deposited on the supporting membrane 16. During the vacuum deposition process, individual molecules of the resistive material attach to the supporting membrane 16 so as to gradually form a thin film or layer. Initially, the layer is quite discontinuous, and accordingly, the resistivity of the layer is quite high. As the process continues, the resistivity of the layer decreases gradually until the layer becomes substantially continuous. At that point, there is a rapid decrease in the resistivity of the layer. As further resistive material is deposited, the resistivity of the layer continues to decrease, however, again at a gradual rate. The process is continued until the desired resistivity is obtained.

When a highly conducting metal is used, for example, a metal having a resistivity which is less than 10 times the resistivity of copper, the reduction in resistivity of the layer at the point at which the layer becomes continuous is extremely rapid. In fact, this rapid reduction in resistivity effectively bridges the range of values which are optimum for use in the microwave field detector 10 of this invention, namely, 100 to 500 ohms per square. As a result, it is difficult, if not impossible, to obtain a resistive layer having an appropriate resistivity. Accordingly, a resistive metal having a resistivity between 50 and 80 times that of copper such as nichrome is preferred rather than a metal having substantially greater conductivity. In this regard, nichrome has a nominal resistivity which is 65 times that of copper.

Moreover, a substantially non-conducting material is not preferred since, to form a layer within the optimum resistivity range, a layer thickness is required which is substantial with respect to the skin depth of currents induced by microwave energy.

Description and Operation of the Apparatus 40 of FIGS. 4 and 6 for Non-Destruction Internal Examination of an Object The apparatus 40 for non-destruction internal examination of an object includes a source 42 of microwave energy connected to a power divider 44 by a transmission line 46. The power divider 44 transmits substantially equal portions of the microwave energy from the microwave source 42 to transmission lines 48 and 50. Transmission line 48 includes a variable attenuator 52 and a variable phase shifter 54. The transmission lines 50 and 54 are terminated by a first microwave antenna 56 and a second microwave antenna 58, respectively. The antennas 56 and 58 are preferably of the collimating type such as lens-compensated horns which radiate essentially plane waves in the near field. The antennas 56 and 58 are aligned, spaced apart, and opposed for emitting parallel, opposing plane waves. Isolators 59 are provided in the transmission lines 50 and 48 to prevent the radiation of each antenna from effecting the operation of the input circuit of the other.

A microwave field detector 10 according to this invention is positioned between the antennas 56 and 58. In this embodiment, the detector 10 is oriented such that it is parallel to the plane waves emitted by the antennas 56 and 58; i.e., the detector 10 is perpendicular to the centerline between the antennas 56 and 58. An object 60, having an irregularly shaped void 62, is also positioned between the antennas 56 and 58.

In the operation of the apparatus 40, the antennas 56 and 58 emit plane waves travelling in opposite directions which form a standing wave between the antennas. The standing wave is characterized by planes of minimum energy (troughs) having planes of maximum energy therebetween. These planes are substantially perpendicular to the centerline between the antennas 56 and 58. It is preferred to adjust the standing waves such that the detector 10 is located in a plane of near zero energy level when an object having no imperfections is positioned between the antennas 56 and 58. This adjustment may be accomplished by the variable attenuator 52 and the variable phase shifter 54. Particularly, the variable attenuator 52 may be adjusted to equalize the amplitude of the waves from the antennas 56 and 58. When the amplitudes of the waves are equal, there will be substantially complete cancellation at the troughs of the standing waves which will result in near zero energy levels at the troughs. The variable phase shifter 54 may be adjusted to change the phase of one wave with respect to the other which will change the position of the troughs of the standing waves along the centerline between the antennas 56 and 58. Accordingly, a trough having substantially zero energy level may be adjusted to coincide with the microwave detector 10.

In the operation of the apparatus 40, microwave detector 10.

In the operation of the apparatus 40, microwave energy from the antenna 56 is transmitted through the object 60. If the object 60 has an imperfection 62, its permeability, effective dielectric constant, or both, will vary at the imperfection. Due to the imperfections, the object 60 will modulate the microwave energy transmitted therethrough in accordance with the variation. More particularly, the microwave energy is both phase and amplitude modulated by the imperfection 62. In view of the previous discussion of the method for adjusting the troughs of the standing waves, it will be understood that the phase and amplitude modulation caused by the imperfection 62 will change both the energy level and the location of the standing wave troughs which are in line with the imperfection. As a result, the detector 10 will no longer be positioned wholly in a trough, i.e., a plane of minimum energy level, and accordingly, the detector 10 will chromatically respond to the change in energy level to provide a display which is representative of the location, size and nature of the imperfection 62.

A representative display of the detector 10 for an imperfection such as the void 62 is illustrated in FIG. 5. With reference to the display of FIG. 5, it will be appreciated that the area on the detector which is in line with the imperfection 62 has received a different amount of energy than the remaining areas. Accordingly, the portions of the microwave detector 10 which is in line with the imperfection 62 will have a color distinct from the rest of the detector.

An alternate embodiment of the apparatus 40 for non-destructive internal examination of an object is shown in FIG. 6. In the embodiment of FIG. 6, the microwave field detector 10 is oriented acutely with respect to the centerline between the antennas 56 and 58 such that it is no longer parallel to the troughs of the standing waves. As a result, the detector 10 will traverse a portion of the standing wave so as to provide an energy gradient across the detector 10. Accordingly, a series of parallel color bars are displayed on the detector 10. Particularly, the portion of the detector at the trough will be black and successive portions of the detector traverses the standing wave, i.e., red, orange, yellow, green, and blue, respectively. When an object 60 having an internal void 62 is examined, the color bars are modified in a manner to indicate the size, location and nature of the imperfection, as illustrated in FIG. 7.

As a still additional embodiment of the present invention, a conducting plane may be used as a substitute for one of the antennas to reflect back the microwave energy radiated from the single antenna to establish a standing wave. By way of illustration, consider the apparatus of FIG. 1 in which an object to be examined is positioned between the microwave detector 10 and the conducting plane 22. The location of a standing wave trough may be varied so as to coincide with the detector 10 by adjusting position of the conducting plane 22 thereby providing an operational capability which is similar to that described with regard to the apparatus 40 of FIG. 9. However, in this embodiment, it is not possible to obtain a trough having substantially zero energy level since there is some diminution of the amplitude of the reflected wave, and accordingly, the wave emitted by the antenna 20 and the reflected wave will not have equal amplitudes for complete wave cancellation at the troughs.

Referring again to the apparatus of FIG. 1, it will be appreciated that an object may be internally examined by positioning it between the antenna 20 and the microwave detector 10. However, in this embodiment, the detector will respond only to the modulation in the amplitude of the microwave energy caused by transmission through the object to be examined. The foregoing embodiments respond to both phase and amplitude modulation. In fact, the foregoing embodiments are quite sensitive to variations in phase, and accordingly, they are preferred since they provide optimum resolution and sensitivity.

In view of the above discussion, it will be appreciated that the apparatus 40 provides an operation result which is analogous to that of an X-ray fluoroscope. Therefore, apparatus described in this section may be loosely described as a "microwave fluoroscope." However, the apparatus of this invention provides a safety advantage over X-ray fluoroscopes since the biological effects of microwave radiation are less severe than the biological effects of X-rays.

Description and Operation of the Source/Load Impedance Matching Instrument 64 of FIG. 8

In FIG. 8, an instrument 64 is shown for matching the output impedance of a source 66 to the input impedance of a load 68. It is well known that maximum power transfer between a source and a load is achieved when the above impedances are equal. Moreover, it is desirable to assure that the input impedance of the load is matched to the output impedance of the source to minimize reflections from the load to the source.

The instrument 64 includes a transmission line 70 between the source and a load which establishes an external field such as an open transmission line, and a microwave detector 10 of this invention positioned in the field of the transmission line. A variable attenuator 72 is provided for adjusting the impedance of the load.

If the impedance of the load does not match the impedance of the source, reflections from the load back to the source will occur which create standing waves in the transmission line. The microwave field detector 10 is positioned in the field to display the standing wave pattern on the transmission line 70 as illustrated in FIG. 8. Particularly, the display of the standing wave pattern will appear as a series of alternating maximum and minimum microwave intensity areas which are spaced along the trace of the transmission line 70. The impedances of the source and load may be balanced by an appropriate change in the impedance of the load, for example, by adjustment of the variable attenuator 72. As the differences between the impedances of the source and load are reduced, the differences between the maximum and minimum intensity levels along the transmission line 70 are correspondingly reduced. The impedances are matched when the display of the energy radiated from the transmission line 70 is uniform.

Description and Operation of the Power Density Meter 74 of FIGS. 9–12

In FIG 9, a meter 74 is shown which is particularly suitable for quantitatively determining the power of the microwave component of a mixed field of microwave and infrared energy. A mixed field of this nature typically occurs in the vicinity of doors and the like of microwave ovens. Since high levels of stray microwave energy is biologically harmful, the meter 74 is useful as a safety device.

The power density meter 74 includes a hand-held display unit 76, and an auxilliary unit 78 for providing a quantitative determination of the power density of the microwave field received by the display unit 76.

Referring now to FIG. 10, the display unit 76 includes a front portion 80 and a rear portion 82. The front portion 80 is provided with a frame 84, a first microwave field detector 86 according to this invention, and a second microwave field detector 88 according to this invention. The microwave field detectors 86 and 88 are separated by a dielectric strip 90 or insulating gap. As shown in FIG. 10, the frame 84 locates and secures the microwave detectors 86 and 88. The microwave field detectors 86 and 88 are provided with impedances of 377 ohms per square.

The rear portion 82 includes a frame 92 having mounted therein a first conducting plane 94 positioned parallel to and spaced from the first microwave field detector 86 at a distance equal to one-quarter of the wavelength of the microwave radiation to be measured, and a second conducting plane 96 positioned parallel to and spaced from the second microwave field detector 88 at a distance equal to one-half of the wavelength of the microwave energy to be measured. The positions of the conducting planes 94 and 96 with respect to the microwave field detectors 86 and 88 may be clearly seen in FIG. 11.

The conducting planes 94 and 96 are constructed of wire mesh material to permit viewing through the planes 94 and 96. If the planes have a sufficiently fine mesh, their electrical characteristics will be essentially the same as a continuous conducting plane, at least for the purpose of this apparatus.

The display unit 76 also includes a handle 98 (shown in FIG. 9) to permit convenient positioning of the unit 76 by an operator.

The frames 80 and 82, and the handle 98 are preferably constructed of a material which is essentially transparent to microwave radiation to prevent field distortion. For example, a light polyfoam having a dielectric constant of approximately 1.2 is satisfactory.

The auxiliary unit 78 includes a regulated power supply 98 which provides a constant voltage to first and second current loops 100 and 102, respectively. The first current loop 100 includes a variable potentiometer 104 connected in series with the resistive layer of the first microwave field detector 86. A second current loop 102 includes a variable potentiometer 106 and an ammeter 108 connected in series with the resistive layer of the second microwave field detector 88.

In the operation of the power density meter 74, the variable potentiometers 104 and 106 are adjusted to provide the same color on both detectors. It is important that this initial adjustment be made in the absence of any microwave field. At this time, the current reading on meter 108 is recorded.

Next, the display unit 74 is positioned to receive a mixed field of microwave and infrared radiation. By virtue of the heating effects of the infrared radiation, the microwave detectors 86 and 88 will be elevated in temperature. Also, since there is one-quarter wavelength spacing between the first microwave field detector 86 and the conducting plane 94, the first microwave field detector 86 will absorb substantially all of the incident microwave energy. Therefore, the temperature of the first microwave field detector 86 will reflect the absorption of both the microwave energy and the infrared energy, and accordingly, it will assume a color representative of the total energy received.

On the other hand, the one-half wavelength spacing between the second microwave detector 88 and the second conducting plane 96 results in complete reflection of the microwave energy. Accordingly, the second microwave field detector 88 experiences a temperature increase representative only of the incident infrared radiation, and accordingly, it will assume a color solely representative of the incident infrared radiation.

The amount of the incident microwave radiation can be quantitatively determined by adjusting the variable potentiometer 106 until the colors assumed by the microwave detectors 86 and 88 are again the same. The meter is read to determine the current flowing through the loop 102. The density of the incident microwave power can be determined by substitution into the formula:

$$P = \Delta I^2 R/A$$

where:
- $P$ = the power of the microwave component of the mixed field;
- $A$ = total area of the detector;
- $\Delta I$ = the change in current indicated by meter 106; and
- $R$ = the resistance of the microwave detector 88.

Description and Operation of the Apparatus 110 for Forming Holograms Using MIcrowaves In FIG. 13, an apparatus 110 is shown for forming holograms using microwaves. The apparatus 110 includes a main source of coherent microwave energy 112 which is connected to an illuminating horn antenna 114 and a reference horn antenna 116 radiating essentially equal portions of the microwave energy from the main microwave source 112. An object 118 is positioned in the path of the radiation from the illuminating horn 114 such that the radiation from that source is modulated by transmission through the object. A microwave detector 10 according to this invention is positioned to receive both the modulated radiation from the illuminating horn antenna 114 and the reference beam of radiation from the reference horn antenna 116. In the region of the detector 10, the radiation from the two sources, the illuminating horn antenna 114 and the reference horn antenna 116, interfere to provide an interference pattern at the detector 10. The detector 10 responds to the interference pattern so as to provide a color display thereon representative of the interference fringes. A camera 120 is positioned to photograph the display on the detector 10. Since the colors displayed on the detector 10 serves no purpose in the formation of a hologram, the camera 120 preferably uses black and white film to provide a black and white transparency. It is also preferred to use a green filter 122 positioned before the camera to provide optimum contrast. The film thusly exposed can be developed to provide a hologram which contains three-dimensional information of the object 118.

In the above embodiment, the object 118 is transparent to allow transmission of microwave energy from the illuminating horn 114 therethrough. The apparatus 110 may be modified for objects which are not transparent by positioning the illuminating horn 114 so that it directs microwave energy at the object 118 for reflection therefrom at an angle which causes incidence on the microwave detector 10.

It will now be appreciated that the apparatus 110 for forming holograms using microwave energy is useful for internal nondestructive examination of an object. The apparatus 110 differs from the apparatus 40 in that it provides three-dimensional information of imperfections in an object whereas the apparatus 40 provides dimensional information.

It will now be appreciated that the present invention provides a useful microwave field detector which is significantly less expensive than other devices in the art for this purpose and is extremely simple to use. Importantly, the microwave field detector of this invention is more accurate than the prior devices for this purpose.

While I have described several preferred embodiments of the present invention, it should be understood that various changes, adaptions and modifications may be made therein without departing from the spirit of the invention and the scope of the appending claims.

Having thus described my invention, I claim:

1. A detector for displaying the intensity distribution of a microwave field comprising:

a continuous layer of resistive material of constant thickness having a resistivity between 10 and 120 times that of copper, adapted to receive said microwave field for providing induced internal electrical currents in response thereto said layer having a resistivity of 100–500 ohms/square thereby establishing a temperature distribution on said layer corresponding to said microwave distribution; and liquid crystal temperature sensitive film means, disposed contiguous to said layers of resistive material for imposition of said temperature distribution thereon through thermal transfer between said film means and said layer, for providing a visible display representative of said temperature distribution, said film means being adapted for changing said visible display in accord with changes in said temperature distribution.

2. The detector of claim 1 wherein said temperature sensitive film means comprises cholesteric liquid crystalline phase material.

3. The detector of claim 1 further including membrane means for supporting said layer and said film means having a predetermined low microwave absorption coefficient.

4. The detector of claim 1 wherein said resistive material has a resistivity between 50 and 80 times that of copper.

5. The detector of claim 1 wherein said resistive material is nichrome.

6. The detector of claim 1 wherein said layer has a resistivity of approximately 188.5 ohms per square.

7. The detector of claim 1 further including a calibration circuit comprising:

a variable source of heating current adapted to be connected to said resistive layer for flow of said heating current therethrough; and means for measuring said heating currents whereby the effects of said heating currents on said visible display may be quantitatively compared with the effects of said microwave field.

8. A detector for providing a substantially real time display of the intensity distribution of a microwave field comprising:

a continuous layer of nichrome of constant thickness positioned to receive said microwave field for providing induced internal electrical currents in response to said microwave field intensity distribution thereby establishing a temperature distribution on said layer corresponding to said intensity distribution, said layer having a resistivity of 377 ohms per square and a predetermined thickness for permeation of said induced currents through the entire of said layer;

a cholesteric liquid crystalline film, contiguous said layer for imposition of said temperature distribution thereon through thermal conduction between said film and said layer, for providing a visible display representative of said temperature distribution; and membrane means for supporting said layer and said film having a predetermined low microwave absorption coefficient.

9. The detector of claim 8 further including a calibration circuit comprising:

a variable source of heating current adapted to be connected across opposite ends of said resistive layer; and means for measuring said heating currents whereby the effects of said heating currents on said visible display may be quantitatively compared with the effects of said microwave field.

10. A detector for displaying the intensity distribution of a field of microwave energy having a predetermined wavelength comprising:

a resistive layer of constant thickness adapted to receive said microwave energy for providing induced internal electrical currents in response thereto thereby establishing a temperature distribution on said layer corresponding to said microwave intensity distribution;

temperature sensitive liquid crystal film means, disposed contiguous said resistive layer for imposition of said temperature distribution thereon through thermal transfer between said film means and said layer, for providing a visible display representative of said temperature distribution, said film means being adapted for changing said visible display in accord with changes in said temperature distribution; and conducting plane means disposed one-quarter of said wavelength from said resistive layer for receiving microwave energy transmitted through said layer and for reflecting said energy to said layer thereby providing substantially complete absorption of said reflected microwave energy in said layer.

11. The detector of claim 10 wherein said layer consists essentially of a material having a resistivity between 50 and 80 times that of copper.

12. The detector of claim 10 further including a calibration circuit comprising:

a variable source of heating current adapted to be connected to said resistive layer for flow of said heating current therethrough; and means for measuring said heating currents whereby the effects of said heating currents on said visible display may be quantitatively compared with the effects of said microwave field.

13. The detector of claim 10 wherein said temperature sensitive film means comprises cholesteric liquid crystalline phase material.

14. The detector of claim 10 wherein said layer has a resistivity of approximately 377 ohms per square.

* * * * *